US 9,977,543 B2

(12) United States Patent
Hoffman (10) Patent No.: US 9,977,543 B2
(45) Date of Patent: May 22, 2018

(54) APPARATUS AND METHOD FOR DETECTING SURFACE SHEAR FORCE ON A DISPLAY DEVICE

(71) Applicant: SAMSUNG DISPLAY CO., LTD., Yongin, Gyeonggi-Do (KR)

(72) Inventor: David M. Hoffman, Fremont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 112 days.

(21) Appl. No.: 14/609,353

(22) Filed: Jan. 29, 2015

(65) Prior Publication Data
US 2015/0242056 A1   Aug. 27, 2015

Related U.S. Application Data

(60) Provisional application No. 61/945,743, filed on Feb. 27, 2014.

(51) Int. Cl.
*G06F 3/042* (2006.01)
*G06F 3/041* (2006.01)

(52) U.S. Cl.
CPC .......... *G06F 3/0428* (2013.01); *G06F 3/0412* (2013.01); *G06F 3/0414* (2013.01);
(Continued)

(58) Field of Classification Search
CPC ...... G06F 3/042; G06F 3/0412; G06F 3/0428; G06F 3/0421; G06F 3/0423; G06F 3/0425; G06F 3/0426; G06F 3/0416; G06F 3/0414; G06F 2203/04109; G06F 2203/04106; G06F 3/0308; G02F 1/13338;
(Continued)

(56) References Cited

U.S. PATENT DOCUMENTS 9,052,775 B1 * 6/2015 Salisbury ................ G01L 5/226
2008/0074401 A1 * 3/2008 Chung .................. G02F 1/1368
345/175

(Continued)

FOREIGN PATENT DOCUMENTS

KR    10-1360631    2/2014

OTHER PUBLICATIONS

EPO Search Report dated Jul. 3, 2015, for corresponding European Patent application 15156684.1, (7 pages).

(Continued)

*Primary Examiner* — Grant Sitta
*Assistant Examiner* — Amen Bogale
(74) *Attorney, Agent, or Firm* — Lewis Roca Rothgerber Christie LLP (57) ABSTRACT

A display device includes: a pixel array including a plurality of pixels; a plurality of infrared (IR) emitters to emit IR light towards a surface of the display device; a plurality of IR detectors to detect IR light; a deformable layer on the pixels, on the IR emitters, on the IR detectors, and at the surface of the display device; and a plurality of tracers at the deformable layer to reflect the IR light emitted by the IR emitters towards the IR detectors and to, while a shear force is being applied at a point of contact at the surface of the display device, shift ones of the tracers around the point of contact in a direction of the shear force such that IR reflectance at the surface of the display device is changed.

19 Claims, 7 Drawing Sheets

(52) U.S. Cl.
CPC .......... *G06F 3/0416* (2013.01); *G06F 3/0421* (2013.01); *G06F 2203/04106* (2013.01); *G06F 2203/04109* (2013.01)

(58) Field of Classification Search
CPC ....... G02F 2001/13312; G02F 2203/11; G02F 2203/04109; G02F 2203/04106; G02B 5/045; G02B 5/08; G02B 5/0808; G02B 5/0816; G02B 5/0825; G02B 5/0833; G02B 5/0841; G02B 5/085; G02B 5/0858; G02B 5/0866; G02B 5/0875; G02B 5/0883; G02B 5/0891; G02B 5/0226; G02B 5/02; G02B 5/0284; G02B 6/0055; G02B 6/0031; G02B 6/0073; G02B 6/0051; G02B 6/10; G02B 6/022; G02B 6/0018; G02B 6/0016; G02B 6/004; G02B 6/0041; G02B 6/0043; G02B 26/0833; G02B 26/08; G02B 26/0808; G02B 26/0816; G02B 26/0825; G01L 1/24; G01L 1/241; G01L 1/242; G01L 1/243; G01L 1/245; G01L 1/246; G01L 1/247; G01L 1/248; B42D 25/382; C09C 2200/24; H01L 25/167; H01L 51/5271; G01B 11/14; G01B 11/16; G01B 11/161; G01B 11/162; G01B 11/165
See application file for complete search history.

(56) References Cited

U.S. PATENT DOCUMENTS

| | | | |
|---|---|---|---|
| 2008/0192025 A1* | 8/2008 | Jaeger | G06F 3/0421 345/173 |
| 2008/0231418 A1 | 9/2008 | Ophey et al. | |
| 2009/0315989 A1* | 12/2009 | Adelson | A61B 5/1172 348/135 |
| 2010/0117989 A1 | 5/2010 | Chang | |
| 2010/0302210 A1* | 12/2010 | Han | G06F 3/0412 345/175 |
| 2011/0043487 A1 | 2/2011 | Huang et al. | |
| 2011/0244588 A1* | 10/2011 | Maity | G01N 21/45 436/164 |
| 2012/0086672 A1* | 4/2012 | Tseng | G06F 3/0416 345/175 |
| 2012/0105358 A1 | 5/2012 | Momeyer et al. | |
| 2012/0212451 A1* | 8/2012 | Large | G06F 3/0425 345/175 |
| 2012/0256825 A1 | 10/2012 | Nakanishi | |
| 2013/0222346 A1* | 8/2013 | Chen | G06F 3/0425 345/175 |

OTHER PUBLICATIONS

Korean Patent Abstracts No. 10-2013-0103905 A dated Sep. 25, 2013 corresponding to Korean Publication No. 10-1360631 dated Feb. 3, 2014 at set forth above.

* cited by examiner

APPARATUS AND METHOD FOR DETECTING SURFACE SHEAR FORCE ON A DISPLAY DEVICE

CROSS-REFERENCE TO RELATED APPLICATION(S)

The present application claims priority to and the benefit of U.S. Provisional Application No. 61/945,743, filed Feb. 27, 2014, entitled "DISPLAY OPTICAL SHEAR DETECTION SYSTEM," the entire content of which is incorporated herein by reference in its entirety.

BACKGROUND

1. Field

Embodiments of the present invention relate to an apparatus and method for detecting surface shear force on a display device.

2. Related Art

Display devices have become increasingly popular and are widely used, such as in cell phones, computer monitors, televisions, tablets, etc. These display devices may be any type of display, including an organic light emitting display (OLED), a liquid crystal display (LCD), etc. In particular, display devices including optical sensors have been developed, for example, to detect a user's interaction with the display device (e.g., an interaction with the display device via the user's finger or via the user's use of a stylus).

However, although display devices are able to detect a position of a user interaction (e.g., a user's touch), display devices have been limited in the ability to detect pressure of a touch interaction by the user. In particular, display devices are limited in the ability to sense a shear force (or shearing force) exerted by a user upon the display device. An example of a shear force interaction with a display device could be when a user applies pressure with the user's finger at a point on the display device and, while maintaining the position and the downward force of the finger, applies an isometric horizontal force (a shearing force) in any direction along the surface of the display device.

A display device capable of sensing a user's shear force upon the device is desirable, as this capability expands the breadth of interaction between a user and the display. Furthermore, a display device capable of sensing a shear force that is easy and inexpensive to manufacture is also desirable.

SUMMARY

Aspects of embodiments of the present invention are directed toward a display device that is capable of sensing a shear force interaction with the display device by a user that is also practical and inexpensive to manufacture.

Embodiments of the present invention provide a display device that has an increased capability of sensing various user gestures.

According to an embodiment of the present invention, there is provided a display device including: a pixel array including a plurality of pixels; a deformable layer having a first surface on the pixels and parallel to the pixel array, and a second surface substantially parallel to the first surface; one or more infrared (IR) emitters to emit IR light into the deformable layer; a plurality of IR detectors to detect IR light; and a plurality of tracers at the deformable layer to redirect the IR light emitted by the one or more IR emitters toward the IR detectors and, in response to a shear force, having a magnitude and a direction, being applied at a point of contact at the second surface, to be displaced in the direction of the shear force, such that an irradiance of IR light at an IR detector of the plurality of IR detectors is changed.

In one embodiment, the one or more IR emitters include a plurality of IR emitters at the first surface, to emit IR light toward the second surface. Each of the pixels may include one of the IR emitters and one of the IR detectors.

The plurality of pixels may include a plurality of first pixels each comprising one of the IR emitters, and a plurality of second pixels each comprising one of the IR detectors.

The second pixels may be more numerous than the first pixels.

The first pixels and the second pixels may alternate regularly throughout the pixel array, forming a repeating pattern.

The display device may be to track displacement of the displaced tracers to determine a magnitude of the shear force and the direction of the shear force.

The display device may be to determine a density of the tracers around the point of contact to determine a magnitude of the shear force and the direction of the shear force.

The tracers may include dichroic mirrors to reflect IR light and to allow visible light to pass through.

The tracers may be patterned at regular intervals across the surface of the display device.

The tracers may be stochastically patterned, for example, using a deposition process.

In one embodiment, the one or more IR emitters include an IR emitter at an edge of the deformable layer, to emit IR light, into the deformable layer, substantially parallel to the first surface, and the plurality of tracers includes a plurality of frustration sites at the second surface, to scatter the IR light toward the IR detectors.

The frustration sites may be patterned at regular intervals across the surface of the display device, The frustration sites may be patterned stochastically.

The frustration sites may include cavities at the deformable layer.

The frustration sites may include clusters of nanoparticles to allow visible light to pass and to scatter IR light emitted from the IR emitter.

The nanoparticles may include silver nanoparticles with a silica core.

The display device may be to track displacement of the displaced frustration sites to determine a magnitude of the shear force and the direction of the shear force.

The display device may be to determine a density of the frustration sites around the point of contact to determine a magnitude of the shear force and the direction of the shear force.

According to an embodiment of the present invention, there is provided a method for detecting a surface shear force, having a magnitude and a direction, on a display device including a plurality of tracers and a plurality of infrared (IR) detectors, the method including: activating one or more IR emitters; receiving an IR image from the plurality of IR detectors, the image including a detected IR irradiance for each of the IR detectors of the plurality of IR detectors; determining whether a touch is present on the display device, utilizing signal processing of the IR image; and, when a touch is present: detecting coordinates of the touch; and detecting the magnitude and direction of a shear force at the touch.

In one embodiment, the detecting the magnitude and direction of a shear force at the touch includes: computing a vector displacement map from the differences between a set of reference positions of the tracers and a set of respective distorted positions of the tracers, the vector displacement map including a plurality of vectors, computing the direction of the shear force as the direction of the average of the vectors, and computing the magnitude of the shear force as a proportionality constant times the average of the magnitude of the vectors.

In one embodiment, the detecting the magnitude and direction of a shear force at the touch includes: dividing a region about the coordinates of the touch into polar coordinate zones; estimating a tracer density in each zone; determining, from the estimated tracer densities, a maximum density gradient having a magnitude and a direction; computing the direction of the shear force as the direction of the maximum density gradient; and computing the magnitude of the shear force as a proportionality constant times the magnitude of the maximum density gradient.

BRIEF DESCRIPTION OF THE DRAWINGS

The above and other aspects of embodiments of the present invention will become more apparent by describing in detail example embodiments thereof with reference to the accompanying drawings, in which.

DETAILED DESCRIPTION

Hereinafter, embodiments of the present invention will be described more fully with reference to the accompanying drawings, in which example embodiments of the present invention are shown. As those skilled in the art would realize, the described embodiments are susceptible to various modifications and alternative forms without departing from the spirit or scope of the present invention. For clarity of the description of the present invention, some elements or features not required for the complete understanding of the present invention may be omitted.

The terms used in the present specification are used to describe particular embodiments, and are not intended to limit the present invention. For example, it will be understood that, although the terms "first," "second," etc., may be used herein to describe various elements, these elements would not be limited by the strict construction of these terms. Instead, these terms are used only to distinguish one component from another. Further, an expression used in the singular encompasses the expression of the plural, unless it has a clearly different meaning in the context. In the present specification, it is to be understood that terms such as "comprising," "including," "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent deviations in measured or calculated values that would be recognized by those of ordinary skill in the art.

It will be understood that when an element or layer is referred to as being "on," "connected to," or "coupled to" another element or layer, it can be directly on, connected to, or coupled to the other element or layer, or one or more intervening elements or layers may also be present. Similarly, when an element or layer is referred to as being "connected at" or "coupled at" another element or layer, the element or layer may be directly or indirectly "connected at" or "coupled at" said another element or layer. When an element is referred to as being "directly on," "directly connected to," "directly coupled to," "directly connected at," or "directly coupled at" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper," and the like may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Further, when describing embodiments of the present invention, the use of "may" relates to "one or more embodiments of the present invention."

Like reference numerals in the drawings denote like elements, and repeated descriptions thereof may be omitted.

According to embodiments of the present invention, a display device is capable of changing properties at its surface in response to a user interaction with the display device (e.g., when a user touches the display). The change of the display device in response to a user interaction creates augmented optical properties deviating from the normal optical properties of an untouched display at the point of contact. The changed optical properties of the display device at its surface indicate a shear force at the point of contact. According to embodiments of the present invention, the optical changes in the light reflectance are detected by light sensors embedded in the display device so as to discern the direction and magnitude of the forces at the touched surface.

Because embodiments of the present invention are capable of sensing shear forces at a surface of a display device, numerous new features and applications may be realized. For example, any position on a touch screen of the display device can control, via user isometric movements causing shear forces on the display device, a track point virtual pointer on the display similar to how a mouse controls a pointer on a computer. Similarly, as another example, detectability of shear forces can be utilized to implement a virtual joystick.

In some embodiments, these applications may be utilized, for example, in the context of small display devices having limited screen areas (e.g., smart watches). Furthermore, because isometric movements of a user tend to be more finely controlled, the control of the pointer may be more precise. However, embodiments of the present invention are not limited to single-point gestures, as multi-point isometric gestures may also be detected, which will be described in more detail below.

Figure 1A:
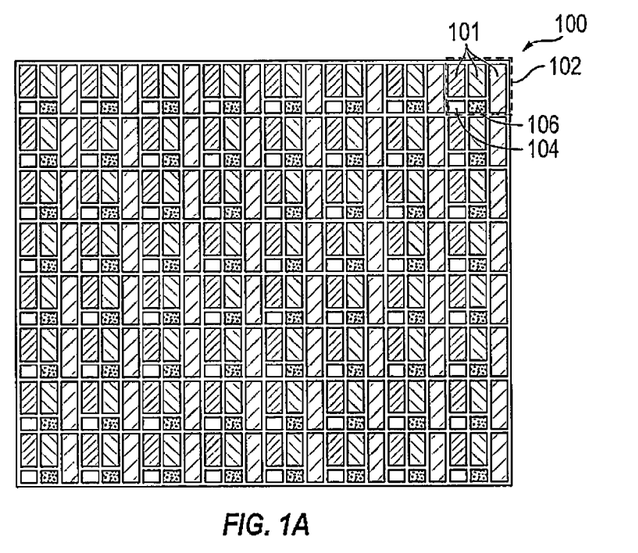
FIG. 1A illustrates a top view of a pixel array of a display according to an embodiment of the present invention.

FIG. 1A illustrates a top view of a pixel array of a display according to an embodiment of the present invention.

Referring to FIG. 1A, a display device includes a pixel array 100. The pixel array 100 includes a plurality of pixels 102. Each pixel 102 includes a plurality of sub-pixels 101. Each pixel 102 includes three sub-pixels 101, and the sub-pixels 101 may each correspond to a different color (e.g., red, green, and blue). However, embodiments of the present invention are not limited to pixels including three sub-pixels, as any suitable number of sub-pixels may be included in each pixel, for example, four sub-pixels per pixel.

Furthermore, in a space that is normally occupied by a sub-pixel, an infrared (IR) emitter 104 is disposed at an area adjacent to the sub-pixel 101. Similarly, in a space that is normally occupied by another sub-pixel 101, an IR detector 106 is disposed at an area adjacent to the other sub-pixel 101. The IR emitter 104 may be adjacent to and take up space allocated to a red sub-pixel, and the IR detector 106 may be adjacent to and take up space allocated to a green sub-pixel, or vice versa. However, embodiments of the present invention are not limited to this arrangement of sub-pixels, IR emitters, and IR detectors, as any suitable arrangement may be utilized. For example, the IR detectors and IR emitters may be located at a black matrix between pixels.

Figure 1B:
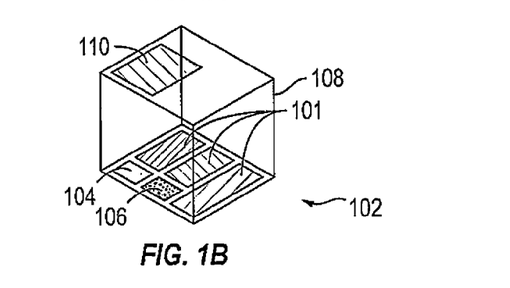
FIG. 1B illustrates a perspective view of a pixel of the pixel array shown in FIG. 1A according to an embodiment of the present invention.

FIG. 1B illustrates a perspective view of a pixel of the pixel array shown in FIG. 1A according to an embodiment of the present invention.

Referring to FIG. 1B, a deformable layer 108 is above the pixel 102. The deformable layer 108 may be located above substantially the entire pixel array 100. The deformable layer 108 may be transparent to visible light. Additionally, a dichroic mirror (or hot mirror), 110 is on the deformable layer 108 above the pixel 102 at an area corresponding to the IR emitter 106. The dichroic mirror 110 may be transparent to visible light but reflective to IR light.

As such, according to embodiments of the present invention, a mosaic pixel array is implemented including both IR emitters and IR detectors. Above a deformable layer, a top surface is patterned with thin film dichroic mirrors above the emitters, the dichroic mirrors being tuned to redirect (e.g., reflect) IR light while allowing light having other wavelengths (e.g., visible light) to pass. Accordingly, as further discussed below, during the application of a shear force to the display, the position of the dichroic mirrors will shift and the detectors can measure this shift and infer the shear.

According to other embodiments of the present invention, IR light may be flood illuminated (e.g., by a backlight) towards a surface of a display device where the dichroic mirrors are located. These embodiments may be used in conjunction with, for example, an LCD.

Although FIGS. 1A and 1B illustrate a display device including a one-to-one ratio of IR emitters and IR detectors, embodiments of the present invention are not limited to this ratio, and any suitable ratio may be utilized as desired. For example, a display device may include more IR detectors than IR emitters.

Figure 2:
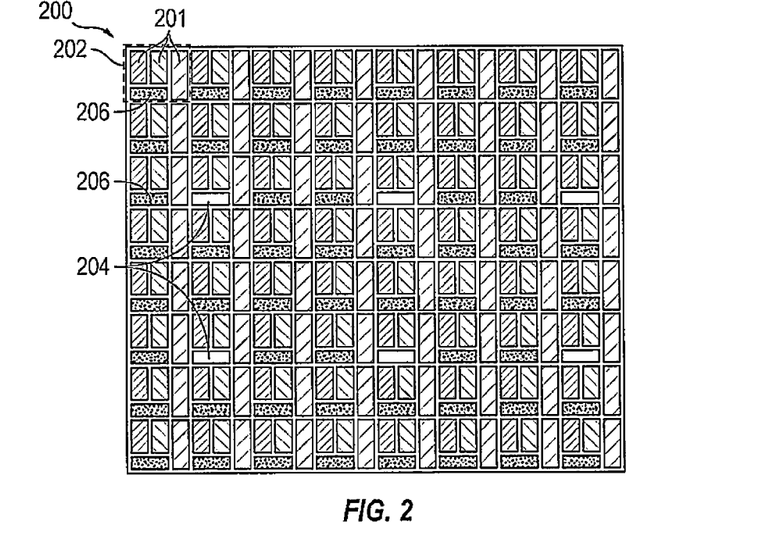
FIG. 2 illustrates a top view of a pixel array of a display according to another embodiment of the present invention.

FIG. 2 illustrates a top view of a pixel array of a display according to another embodiment of the present invention.

Referring to FIG. 2, a display device includes a pixel array 200. The pixel array 200 includes a plurality of pixels 202. Each pixel 202 includes a plurality of sub-pixels 201. Each pixel 202 includes three sub-pixels 201, and the sub-pixels 201 may each correspond to a different color (e.g., red, green, and blue).

Furthermore, at certain pixels, e.g., at a plurality of first pixels, and in a space that is normally occupied by two sub-pixels 201, an IR emitter 204 is disposed at an area adjacent to the two sub-pixels 201. According to the present embodiment, the IR emitter 204 has a rectangular shape and has a horizontal orientation in relation to the vertical orientations of the sub-pixels 201. Similar to the placement and shape of the IR emitters 204, IR detectors 206 are disposed at some of the pixels, e.g., at a plurality of second pixels, in the pixel array 200.

According to the present embodiment, the IR emitters 204 and the IR detectors 206 are patterned at regular intervals throughout the pixel array, with the IR detectors 206 being more numerous than the IR emitters 204 (e.g., with the second pixels being more numerous than the first pixels). In one embodiment, the first and second pixels are equally numerous, and alternate regularly throughout the display, forming a repeating pattern. As shown in FIG. 2, the IR emitters 206 appear at every third row of the pixel array 200, and, within those rows, at every third pixel 202. As such, the remainder of the pixels 202 includes IR detectors 206. However, embodiments of the present invention are not limited to the illustrated arrangement, as any suitable arrangement of IR emitters and IR detectors may be used as desired. For example, the IR emitters 204 may be located at every row of the pixel array 200 and further may be located at every third pixel 202 in each row. Furthermore, rather than being located at pixels, IR detectors and IR emitters may be located at a black matrix between the pixels.

Figure 3A:
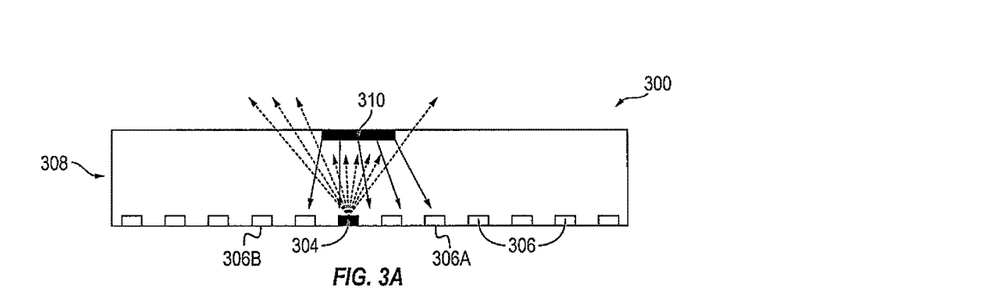
FIG. 3A illustrates a cross-sectional view of a surface of a display device in an untouched state according to an embodiment of the present invention.

FIG. 3A illustrates a cross-sectional view of a surface of a display device in an untouched state according to an embodiment of the present invention.

Figure 3B:
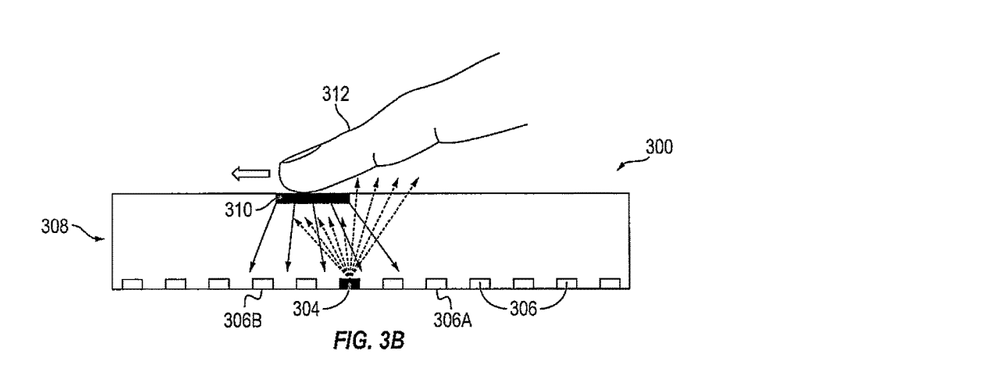
FIG. 3B illustrates a cross-sectional view of the surface of the display device shown in FIG. 3A undergoing a shear force according to an embodiment of the present invention.

Referring to FIG. 3A, a surface of a display device 300 includes a plurality of IR detectors 306, an IR emitter 304, a deformable layer 308 on the IR detectors 306 and IR emitter 304, and a hot mirror 310 on the deformable layer 308. As illustrated, the deformable layer has a first surface (the lower surface of the deformable layer 308 as illustrated in FIGS. 3A and 3B) on the pixels, on the IR emitter 304 and on the IR detectors 306, and a second surface substantially parallel to the first surface (the upper surface of the deformable layer 308 as illustrated in FIGS. 3A and 3B). The display device is shown in FIGS. 3A and 3B as being substantially flat but it may be curved or flexible. In such an embodiment, the deformable layer may, in spite of not being flat, have a first surface and a second surface substantially parallel to the first surface, in the sense that at any point on the display device 300, the second surface may be locally substantially parallel to the first surface.

As shown, the IR emitter 304 generates IR light that travels through the deformable layer 308 towards the hot mirror 310. The generated IR light is redirected (e.g., reflected) by the hot mirror 310 back towards the IR detectors 306. FIG. 3A illustrates a state in which the display device 300 is in an untouched default state, and as such, the hot mirror 310 is also in an untouched default position (e.g., when no shear force is applied to the display device 300). Accordingly, the IR light reflected by the hot mirror 310 is reflected onto certain IR detectors 306 when the display device 300 is in an untouched state.

FIG. 3B illustrates a cross-sectional view of the surface of the display device shown in FIG. 3A undergoing a shear force according to an embodiment of the present invention.

Referring to FIG. 3B, a user's finger 312 exerts a shear force on the display device 300. Due to the exerted shear force, the hot minor 310 laterally shifts, or is displaced, in the same direction as the shear force. Consequently, due to the changed position of the hot mirror 310, the IR irradiance at the IR detectors may change. The IR light reflected by the hot minor 310 is directed towards different IR detectors 306 (which experience an increase in IR irradiance, e.g., detector 306B) than those that receive the IR light when the hot mirror 310 is in the default state (e.g., the IR detectors, such as detector 306A, that receive IR light in FIG. 3A, which experience a decrease in IR irradiance when the hot mirror is displaced). As such, the shift in IR reflection from the original default reflection detected by the IR detectors 306 can indicate a direction of a shear force occurring at the surface of the display device 300.

Although FIGS. 3A and 3B illustrate one hot mirror, according to embodiments of the present invention, an array of regularly spaced hot mirrors may be patterned throughout the surface of the display device. The hot mirrors may also be much smaller than a user's finger. As such, according to some embodiments of the present invention, a broadband reflection caused by the user's finger may be sensed, and the hot mirrors adjacent to the user's finger can be utilized to determine hot mirror density around the point of contact between the user's finger and the display device.

Figure 4:
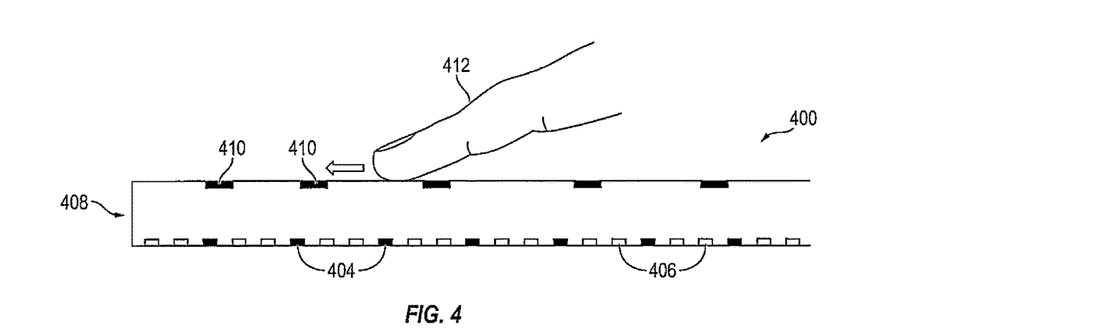
FIG. 4 illustrates a cross-sectional view of a surface of a display device undergoing a shear force according to another embodiment of the present invention.

FIG. 4 illustrates a cross-sectional view of a surface of a display device undergoing a shear force according to another embodiment of the present invention.

Referring to FIG. 4, a surface of a display device 400 includes a plurality of IR detectors 406, a plurality of IR emitters 404, a deformable layer 408 on the IR detectors 406 and on the IR emitters 404, and a plurality of hot mirrors 410 at the deformable layer 408.

The hot mirrors 410 may be regularly spaced across the surface of the display device 400 when the display device 400 is in an untouched default state. However, as shown in FIG. 4, a user's finger 412 applies a forward shear force against the surface of the display device 400, causing an increased density of hot mirrors 410 at a front area ahead of a point of contact (i.e., the point where the user's finger 412 and the surface of the display device 400 contact each other) in the direction of the shear force, and causing a decreased density of hot mirrors 410 at a back area behind the point of contact in a direction opposite to the shear force.

Consequently, the IR detectors 406 can detect this shift in the locations of some of the hot mirrors 410 by sensing the changed reflections of the IR light that is generated by the IR emitters 404. In particular, the IR detectors 406 in front of the point of contact in the direction of the shear force will sense the increase in hot mirror density by sensing increased IR reflections at the front area, and the IR detectors 406 behind the point of contact in the direction opposite to the shear force will sense the decrease in hot mirror density by sensing decreased IR reflections at the back area.

According to embodiments of the present invention, the user's finger creates a strong broadband reflectance, and therefore the reflection caused by the finger can be used by the display device to localize the position of the touch for more accurate shear force sensing.

According to embodiments of the present invention, a pattern of hot mirrors may be deposited at the top surface of the deformable layer, and the hot mirrors may exhibit properties of minimal interference with visible light while being able to reflect IR light, resulting in an IR light reflectance pattern that is readily imageable by the IR detectors. According to some embodiments of the present invention, a protective coating may be applied over the pattern of hot mirrors. According to other embodiments of the present invention, the hot mirrors may be encased within the deformable layer. Vertical distances between the hot mirrors and the IR emitters may be any suitable distance such that the IR emitters are able to fully illuminate the hot mirrors.

Figure 5A:
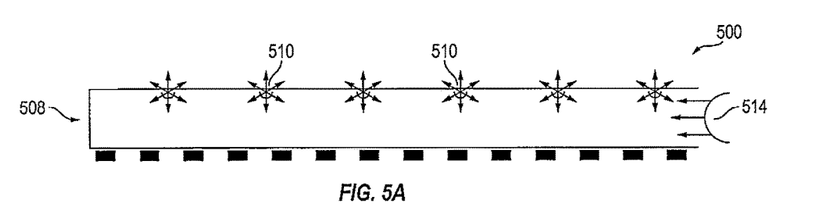
FIG. 5A illustrates a cross-sectional view of a surface of a display device that utilizes frustration sites according to yet another embodiment of the present invention.

FIG. 5A illustrates a cross-sectional view of a surface of a display device that utilizes frustration sites according to an embodiment of the present invention.

According to another embodiment of the present invention, a deformable layer may be patterned with frustration sites, and the deformable layer may be used as a waveguide. A shear force on the deformable layer may shift the frustration sites, and detectors can detect this change (as a displacement of the displaced frustration sites, or as a change in density of the frustration sites) when imaging reflectance patterns.

Figure 5B:
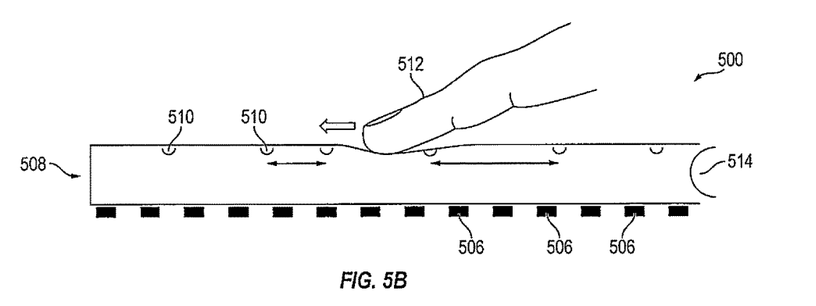
FIG. 5B illustrates a cross-sectional view of the surface of the display device that utilizes frustration sites shown in FIG. 5A undergoing a shear force according to an embodiment of the present invention.

Referring to FIG. 5A, a surface of a display device 500 includes a plurality of IR detectors 506, a deformable layer 508 on the IR detectors 506, a plurality of frustration sites 510 at the deformable layer 508, and an IR emitter 514 at an end of the deformable layer. According to embodiments of the present invention, the IR emitter 514 pulses IR light along the length, and substantially in the plane of the deformable layer 508, e.g., substantially parallel to the first surface of the deformable layer, such that the IR light is guided by total or substantially total internal reflection within the deformable layer 508, and a portion of the IR light scatters from each frustration site 510 toward IR detectors 506 (FIG. 5B). In the present embodiment, the frustration sites 510 are cavities or pits in the deformable layer 508. The frustration sites 510 may be regularly spaced (or they may be patterned stochastically) across the surface of the display device 500 when the display device 500 is in an untouched default state. The IR emitter 514 may be any suitable light emitter, for example, a light-emitting diode (LED) that emits IR.

Because each of the frustration sites scatters IR light in all directions, as shown in FIG. 5A, they can also act as an illumination source to detect hover gestures. Also, in addition to the frustration sites, a user interaction with the surface of the display device will also frustrate total internal reflectance of the deformable layer, and this property can be utilized for touch detection.

FIG. 5B illustrates a cross-sectional view of the surface of the display device that utilizes frustration sites shown in FIG. 5A undergoing a shear force according to an embodiment of the present invention.

Referring to FIG. 5B, a user's finger 512 applies a forward shear force against the surface of the display device 500, causing an area of compressed spacing between frustration sites 510 at a front area ahead of a point of contact (i.e., the point where the user's finger 512 and the surface of the display device 500 contact each other) in the direction of the shear force, and causing an area of stretched spacing between frustration sites 510 at a back area behind the point of contact in a direction opposite to the shear force.

Consequently, the IR detectors 506 can detect this compression and stretching of frustration sites 510 by sensing the change in refractance (e.g., scattering) of the IR light that is caused by the frustration sites 510. For example, the IR detectors 510 in front of the point of contact in the direction of the shear force will sense an increase in IR by sensing increased IR refractance at the front area, and the IR detectors 510 behind the point of contact in the direction opposite to the shear force will sense a decrease in IR by sensing decreased IR refractance at the back area.

Figure 6:
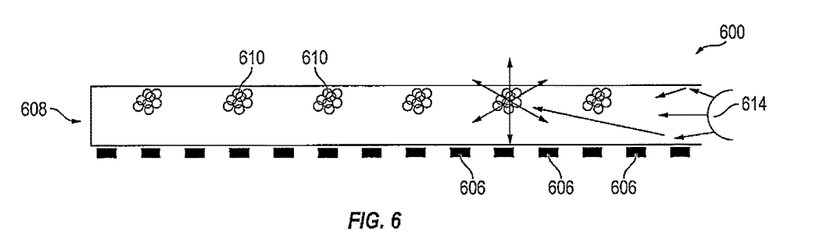
FIG. 6 illustrates a cross-sectional view of a surface of a display device that utilizes frustration sites according to another embodiment of the present invention.

FIG. 6 illustrates a cross-sectional view of a surface of a display device that utilizes nanoparticle scatter sites according to another embodiment of the present invention.

Referring to FIG. 6, a surface of a display device 600 includes a plurality of IR detectors 606, a deformable layer 608 on the IR detectors 606, a plurality of frustration sites 610 at the deformable layer 608, and an IR emitter 614 at an end of the deformable layer. According to embodiments of the present invention, the IR emitter 614 emits IR light along the length of the deformable layer 608, which acts as a waveguide such that the IR light is redirected by (e.g., scatters from) each of the frustration sites 610. In the present embodiment, the frustration sites 610 are clusters of nanoparticles embedded in the deformable layer 608. The frustration sites 610 may be regularly spaced across the surface of the display device 600 when the display device 600 is in an untouched default state. In one embodiment, the clusters are randomly distributed in the waveguide.

Similar to the frustration sites shown in FIG. 5A, each cluster of nanoparticles scatters IR light, causing the IR light to leave the deformable layer waveguide 608 and be detected by the IR detectors 606. The nanoparticle clusters may be transparent to visible light from the display so that interference with displayed images may be decreased. The nanoparticles may be silver nanoparticles with a silica core.

The nanoparticles may be tuned to scatter light having particular wavelengths (e.g., light having wavelengths corresponding to IR) while allowing light having other wavelengths to pass. A nanoparticle having a core of one material with a coating of a second material (such as a silver nanoparticle with a silica core) may be wavelength tuned by adjusting its outer radius, the radius of its core, and the refractive index of the medium in which the nanoparticle is supported.

Figure 7A:
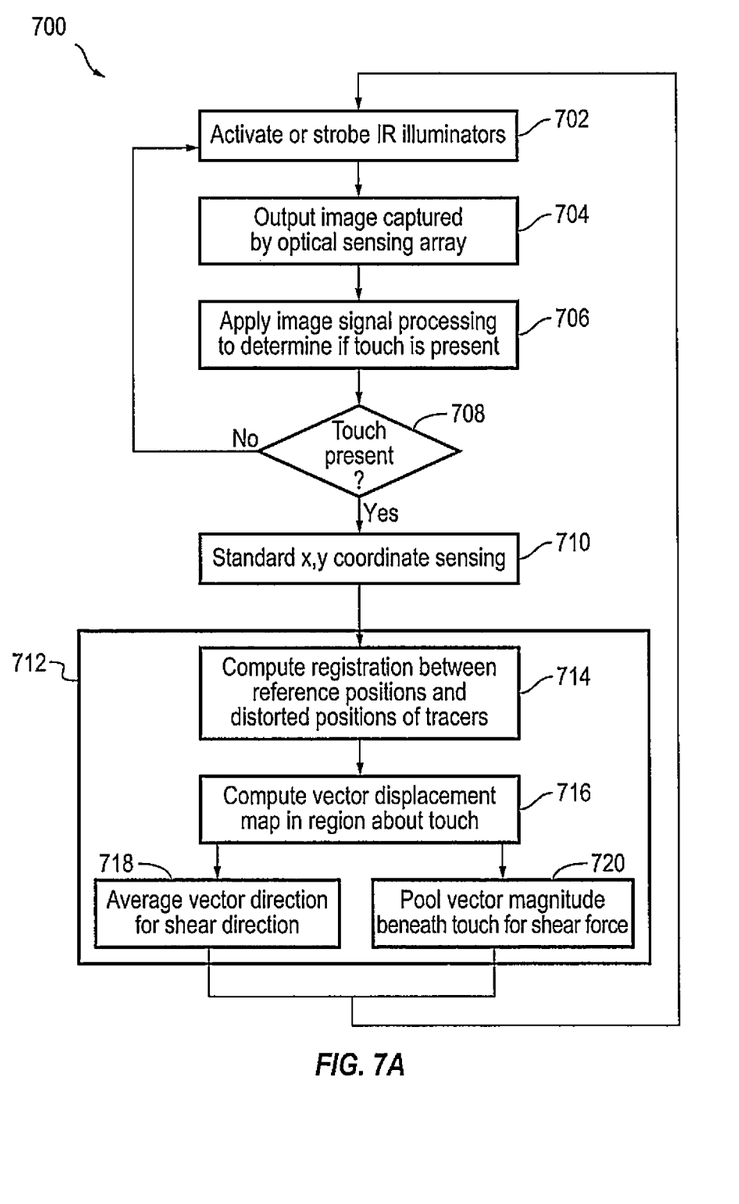
FIG. 7A illustrates a process for detecting a shear force at a display device according to an embodiment of the present invention.

FIG. 7A illustrates a process for detecting a shear force at a display device according to an embodiment of the present invention.

According to some embodiments of the present invention, an analysis involving vector displacement of tracers (e.g., hot mirrors or frustration sites) at the surface of the display device may be utilized to determine shear force direction and magnitude. Tracers may be patterned at regular intervals, or they may be patterned stochastically (e.g., using a deposition process), across the surface of the display device.

Referring to FIG. 7A, according to the present embodiment, the process 700 for detecting a shear force at a display device begins at 702 by activating or strobing IR emitters or illuminators. At 704, an optical sensing array embedded in the display device outputs a captured optical image of the surface of the display device (e.g., an image that captures IR light at the surface of the display device).

At 706, the display device applies image signal processing to identify whether or not a touch interaction is present. If a touch interaction is not present at 708, the process 700 returns to step 702. If a touch interaction is present, at 710 the display device actuates standard x-y coordinate sensing for each touch location to determine the location (e.g., the coordinates) of the touch events. At 712, the device measures the magnitude and direction of any shear force at the touch point.

This measurement proceeds as follows. At 714, the display device computes a registration or disparity between reference positions of tracers at the surface of the display device and their distorted positions. At 716, the display device computes a vector displacement map corresponding to step 714 at a region about the touch position. At 718, the display device averages the vector direction to determine the shear direction, and at 720, the display device pools the vector magnitude beneath the touch position to determine the magnitude of the shear force, and the process 700 repeats. In particular, the magnitude of the average of the vectors in the vector displacement map may be multiplied by a constant of proportionality (which may be proportional to the shear modulus of the deformable layer and inversely proportional to its thickness) to compute the shear force.

According to the present embodiment of analysis of shear force at a display device, individual tracer shifts are mapped and the shear force is aligned with the axis of a majority of vectors of the tracer movements. The display device may keep strict registration of the original positions and the displaced positions. The present embodiment may be utilized when tracer shifts are smaller than the tracer spacing.

Figure 7B:
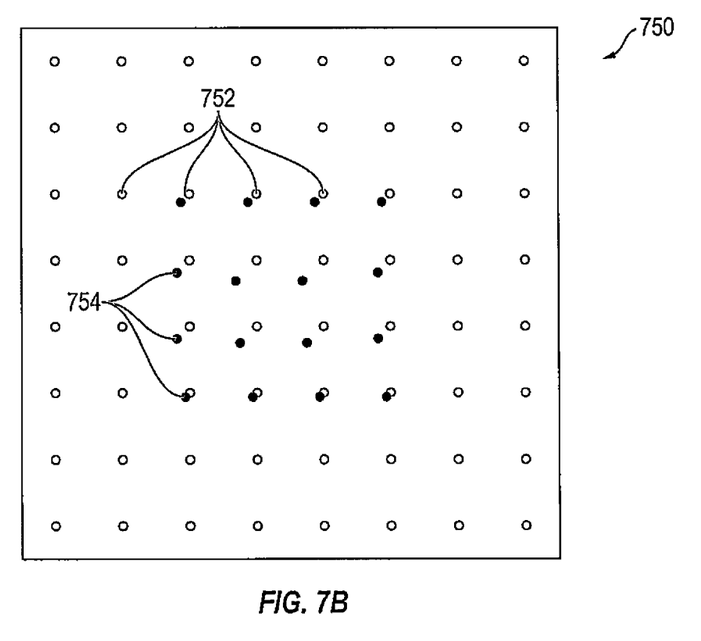
FIG. 7B illustrates a top view of a display device implementing the process shown in FIG. 7A.

FIG. 7B illustrates a top view of a display device implementing the process shown in FIG. 7A.

Referring to FIG. 7B, a surface of display device 750 includes a plurality of reference position tracers 752. After a shear force is applied to the surface of the display device 750, the reference position tracers 752 are displaced to new positions 754 around the point of contact. As such, the display device 750 is able to analyze the shift of tracers to determine the shear force direction and magnitude. For example, the display device 750 may utilize the vector analysis method shown in FIG. 7A to determine the direction and magnitude of the shear force.

Figure 8A:
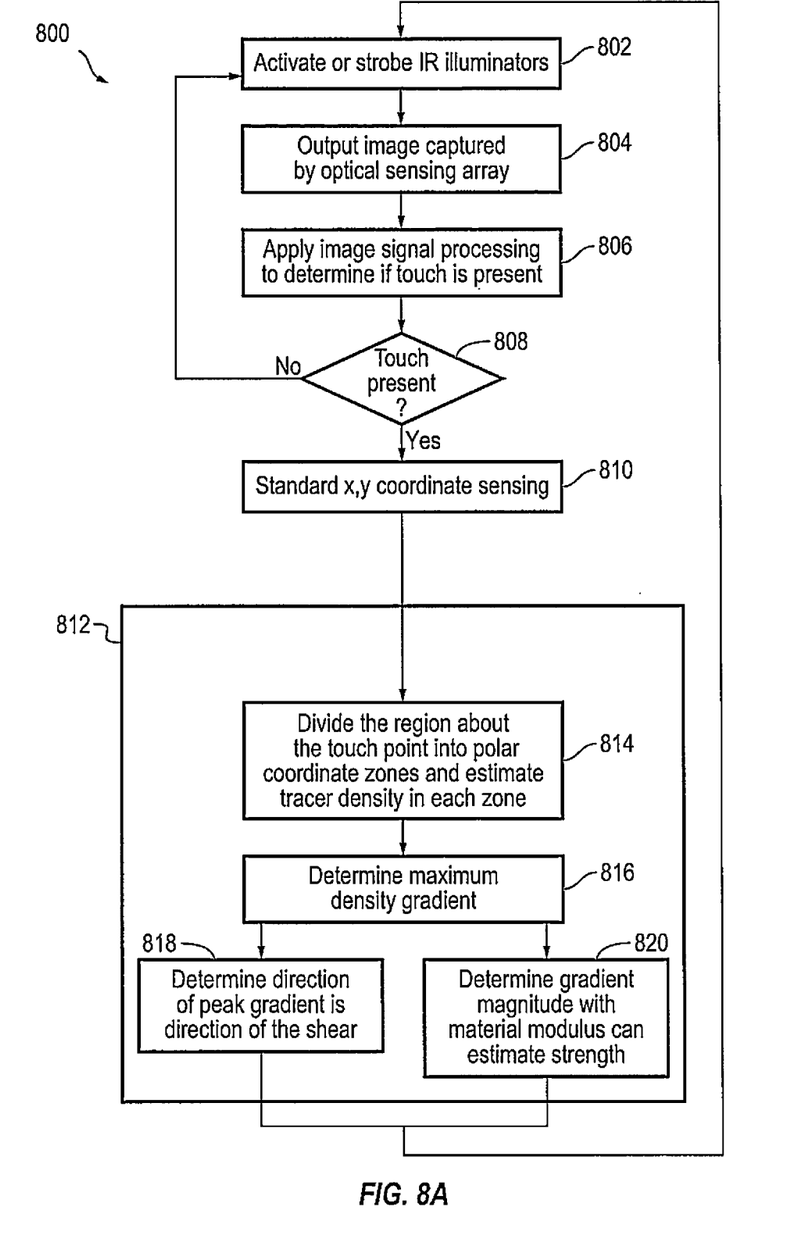
FIG. 8A illustrates a process for detecting a shear force at a display device according to another embodiment of the present invention.

FIG. 8A illustrates a process for detecting a shear force at a display device according to another embodiment of the present invention.

According to some embodiments of the present invention, an analysis involving density of the tracers at the surface of the display device may be utilized to determine shear force direction and magnitude.

Referring to FIG. 8A, according to the present embodiment, the process 800 for detecting a shear force at a display device begins at 802 by activating or strobing IR emitters or illuminators. At 804, an optical sensing array embedded in the display device outputs a captured optical image of the surface of the display device (e.g., an image that captures IR light at the surface of the display device).

At 806, the display device applies image signal processing to identify whether or not a touch interaction is present. If a touch interaction is not present at 808, the process 800 returns to step 802. If a touch interaction is present, at 810 the display device actuates standard x-y coordinate sensing for each touch location to determine the location of the touch events. At 812, the device measures the magnitude and direction of any shear force at the touch point.

This measurement proceeds as follows. At 814, the display device divides the region about the touch point into polar coordinate zones and estimates the tracer density at each zone. At 816, the display device determines a maximum density gradient. At 818, the display device identifies the peak gradient direction to determine the shear direction, and at 820, the display device determines the gradient magnitude with the material modulus to determine the magnitude of the shear force, and the process 800 repeats. In particular, the magnitude of the maximum gradient may be multiplied by a constant of proportionality (which may be proportional to the shear modulus of the deformable layer and inversely proportional to its thickness) to compute the shear force.

Figure 8B:
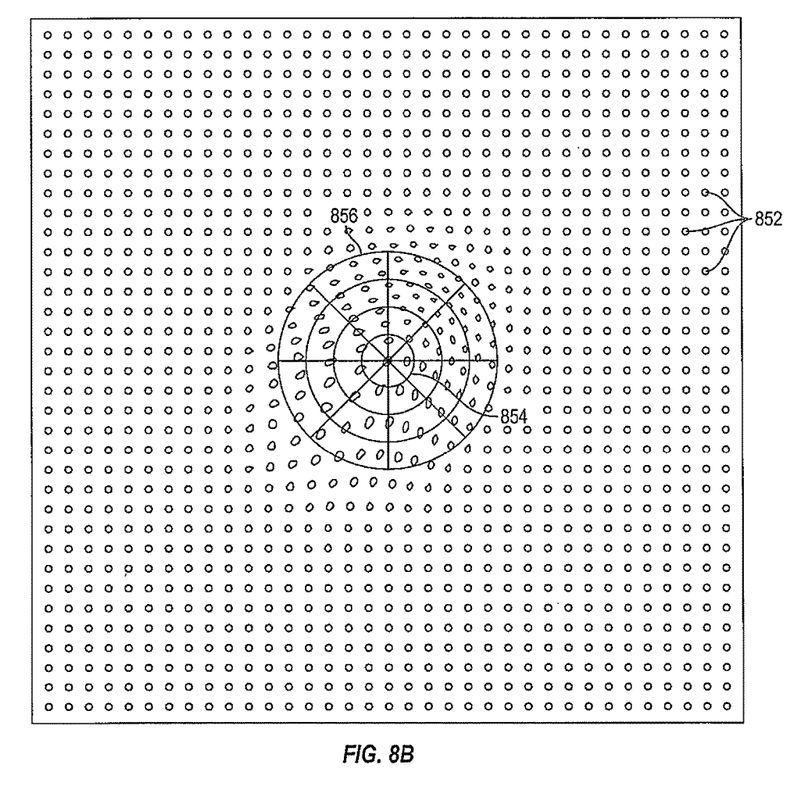
FIG. 8B illustrates a top view of a display device implementing the process shown in FIG. 8A.
Figure 8C:
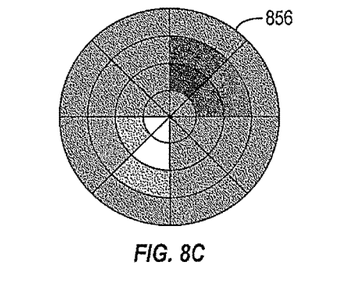
FIG. 8C illustrates a density map of tracers of the display device shown in FIG. 8B.

FIG. 8B illustrates a top view of a display device implementing the process shown in FIG. 8A. FIG. 8C illustrates a density map of tracers of the display device shown in FIG. 8B.

Referring to FIG. 8B, display device includes a plurality of tracers 852, a point of contact 854, and a polar graph 856 centered at the point of contact 854. While undergoing a shear force towards the upper-right corner of the display device, the tracers follow the direction of the shear force, and the density of the tracers accordingly increases at the upper-right quadrant of the polar graph 856, while the density of the tracers decreases at the lower-left quadrant of the polar graph 856.

Referring to FIG. 8C, the polar graph 856 from FIG. 8B is illustrated with shading to signify the density of tracers at segments of the polar graph 856. The darker shades indicate higher density of tracers, while lighter sections indicate lower density of tracers. As shown, the darker shades are at the upper-right quadrant of the polar graph, while the lower-left quadrant contains lighter shades, thereby indicating that a shear force is occurring in a direction from the lower-left quadrant to the upper-right quadrant of the polar graph. The center of the polar graph 856 is the point of contact.

As such, an IR imaging of the surface of the display will output a similar graph as that shown in FIG. 8C. Because more tracers shift to the upper-right quadrant from the lower-left quadrant, more IR light is reflected at the upper-right quadrant, and less IR light is reflected at the lower-left quadrant. As such, a display device may analyze this information, for example, according to the analysis shown in FIG. 8A, to determine the direction and magnitude of the shear force.

The choice of implementation of the analysis process shown in FIG. 7A or in FIG. 8A may depend on various factors. For example, the usage of either one or the other may depend on how numerous the tracers are at the surface of the display device. In particular, if there are less tracers and the spacing is sparse between tracers, the vector displacement analysis shown in FIG. 7A may be used such that corresponding tracer displacement can be accurately tracked from original tracer positions. On the other hand, when the number of tracers at a display device is numerous, it may be more difficult to discern which displaced tracer corresponds to which original tracer position, and therefore the density analysis shown in FIG. 8A may be implemented.

According to embodiments of the present invention, multi-touch gestures including a shear force can also be detected. When multiple touch events are detected, analysis is carried out about each point of contact individually. Because analysis of shear is done locally, the shear forces can be bound specifically to their respective point of contact. Accordingly, embodiments of the present invention can be used for any desired number of touch points.

Moreover, embodiments of the present invention are capable of detecting a hard slide that can be differentiated by a light swipe across the surface of a display device. A hard slide may occur when a user presses on a display with pressure from the user's finger, and the user slides the finger across the display while maintaining the pressure (i.e., a hard slide is a moving force on the display during which a shear force is concurrently being applied). In this case, the user interacts with the display by movement of the finger and by exerting shear force on the display while moving the finger. As such, embodiments of the present invention are capable of sensing a hard slide as an optical shear signature translating across the display. According to some embodiments of the present invention, the detection of a hard slide may be utilized to enable, for example, different scroll functionality or various other user experiences with the display device.

Furthermore, embodiments of the present invention may provide added security to a display device. Because isometric shear force gestures implemented by a user are difficult to discern by an observer, embodiments of the present invention may provide the capability of unlocking a display device by utilizing isometric gestures. For example, according to embodiments of the present invention, fingers of a user need not visibly move for the user to enter a combination of isometric shear gestures to unlock a device.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A display device comprising:
   a pixel array comprising a plurality of pixels;
   a deformable layer having a first surface on the pixels and parallel to the pixel array, and a second surface substantially parallel to the first surface;
   one or more infrared (IR) emitters to emit IR light into the deformable layer;
   a plurality of IR detectors to detect IR light; and a plurality of tracers at the deformable layer to redirect the IR light emitted by the one or more IR emitters toward the IR detectors and, in response to a tangential component of a shear force, having a magnitude and a direction, being applied at a point of contact at the second surface, to be displaced in the direction of the shear force, to cause a displacement of the second surface in a direction parallel to the second surface and to increase a density of the tracers in a region of the deformable layer, the increase in the density causing an irradiance of IR light at an IR detector of the plurality of IR detectors to be changed.

2. The display device of claim 1, wherein the one or more IR emitters comprise a plurality of IR emitters at the first surface, to emit IR light toward the second surface.

3. The display device of claim 2, wherein each of the pixels comprises one of the IR emitters and one of the IR detectors.

4. The display device of claim 2, wherein the plurality of pixels comprises:
a plurality of first pixels each comprising one of the IR emitters; and
a plurality of second pixels each comprising one of the IR detectors.

5. The display device of claim 4, wherein the second pixels are more numerous than the first pixels.

6. The display device of claim 5, wherein the first pixels and the second pixels alternate regularly throughout the pixel array.

7. The display device of claim 1, wherein the display device is to track displacement of the tracers to determine a magnitude of the shear force and the direction of the shear force.

8. The display device of claim 1, wherein the display device is to determine a density of the tracers around the point of contact to determine a magnitude of the shear force and the direction of the shear force.

9. The display device of claim 2, wherein the tracers comprise dichroic mirrors to reflect IR light and to allow visible light to pass through.

10. The display device of claim 9, wherein the tracers are patterned at regular intervals across a surface of the display device.

11. The display device of claim 1, wherein:
the one or more IR emitters comprise an IR emitter at an edge of the deformable layer, to emit IR light, into the deformable layer, substantially parallel to the first surface, and
the plurality of tracers comprises a plurality of frustration sites at the second surface, to scatter the IR light toward the IR detectors.

12. The display device of claim 11, wherein the frustration sites are patterned at regular intervals across the surface of the display device.

13. The display device of claim 12, wherein the frustration sites comprise cavities at the deformable layer.

14. The display device of claim 12, wherein the frustration sites comprise clusters of nanoparticles to allow visible light to pass and to scatter IR light emitted from the IR emitter.

15. The display device of claim 14, wherein the clusters of nanoparticles comprise silver nanoparticles with a silica core.

16. The display device of claim 11, wherein the display device is to track displacement of the frustration sites to determine a magnitude of the shear force and the direction of the shear force.

17. The display device of claim 11, wherein the display device is to determine a density of the frustration sites around the point of contact to determine a magnitude of the shear force and the direction of the shear force.

18. A method for detecting a surface shear force, having a magnitude and a direction, on a display device comprising a plurality of tracers and a plurality of infrared (IR) detectors, the method comprising:
activating one or more IR emitters;
receiving an IR image from the plurality of IR detectors, the IR image comprising a detected IR irradiance for each of the IR detectors of the plurality of IR detectors;
determining whether a touch is present on the display device, utilizing signal processing of the IR image; and, when a touch is present:
detecting coordinates of the touch; and
detecting the magnitude and direction of a shear force at the touch,
wherein the detecting the magnitude and direction of a shear force at the touch comprises:
computing a vector displacement map from a differences between a set of reference positions of the tracers and a set of respective distorted positions of the tracers, the vector displacement map comprising a plurality of vectors,
computing the direction of the shear force as the direction of an average of the vectors, and
computing the magnitude of the shear force as a proportionality constant times an average of the magnitude of the vectors.

19. A method for detecting a surface shear force, having a magnitude and a direction, on a display device comprising a plurality of tracers and a plurality of infrared (IR) detectors, the method comprising:
activating one or more IR emitters;
receiving an IR image from the plurality of IR detectors, the IR image comprising a detected IR irradiance for each of the IR detectors of the plurality of IR detectors;
determining whether a touch is present on the display device, utilizing signal processing of the IR image; and, when a touch is present:
detecting coordinates of the touch; and
detecting the magnitude and direction of a shear force at the touch,
wherein the detecting the magnitude and direction of a shear force at the touch comprises:
dividing a region about the coordinates of the touch into polar coordinate zones;
estimating a tracer density in each zone to form a plurality of estimated tracer densities;
determining, from the estimated tracer densities, a maximum density gradient having a magnitude and a direction;
computing the direction of the shear force as the direction of the maximum density gradient; and
computing the magnitude of the shear force as a proportionality constant times the magnitude of the maximum density gradient.

* * * * *